(12) United States Patent
Weber

(10) Patent No.: US 11,084,453 B2
(45) Date of Patent: *Aug. 10, 2021

(54) IGNITER SUPPORT, SUBASSEMBLY, GAS GENERATOR, AND PROCESS FOR MANUFACTURING A GAS GENERATOR

(71) Applicant: TRW Airbag Systems GmbH, Aschau a. Inn (DE)

(72) Inventor: Bernd Weber, Töging am Inn (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/608,228

(22) PCT Filed: Apr. 4, 2018

(86) PCT No.: PCT/EP2018/058580
§ 371 (c)(1),
(2) Date: Oct. 25, 2019

(87) PCT Pub. No.: WO2018/197168
PCT Pub. Date: Nov. 1, 2018

(65) Prior Publication Data
US 2020/0189516 A1    Jun. 18, 2020

(30) Foreign Application Priority Data
Apr. 28, 2017   (DE) ............... 10 2017 109 209.9

(51) Int. Cl.
*B60R 21/264*     (2006.01)
*B29C 45/14*      (2006.01)
(Continued)

(52) U.S. Cl.
CPC ...... *B60R 21/264* (2013.01); *B29C 45/14467* (2013.01); *B29C 45/14639* (2013.01);
(Continued)

(58) Field of Classification Search
CPC .............. B60R 21/264; B60R 22/4628; B60R 2021/26029; B60R 2021/26082;
(Continued)

(56) References Cited

U.S. PATENT DOCUMENTS 6,142,515 A * 11/2000 Mika ................... B60R 21/2644
102/531
6,315,322 B1 * 11/2001 Mika ................... B60R 21/2644
280/736

(Continued)

FOREIGN PATENT DOCUMENTS

DE      102009023593    12/2010
JP         2008241186    10/2008
(Continued)

*Primary Examiner* — Samir Abdosh
(74) *Attorney, Agent, or Firm* — Tarolli, Sundheim, Covell & Tummino LLP

(57) ABSTRACT

The invention describes an igniter support (22) for an igniter unit (20) of a gas generator (10), comprising a first holder element (30) made from a first material and a second holder element (32) made from a second material different from the first material. The two holder elements (30, 32) can be positively coupled to each other, especially can be at least partially positively nested. Further, a subassembly (16), a gas generator (10) as well as a method for manufacturing a gas generator (10) are described.

15 Claims, 4 Drawing Sheets

(51) Int. Cl.
*B60R 22/46* (2006.01)
*F42B 3/26* (2006.01)
*B29L 22/02* (2006.01)
*B60R 21/26* (2011.01)

(52) U.S. Cl.
CPC ............ *B60R 22/4628* (2013.01); *F42B 3/26* (2013.01); *B29K 2995/0005* (2013.01); *B29K 2995/0007* (2013.01); *B29L 2022/027* (2013.01); *B60R 2021/26029* (2013.01); *B60R 2021/26082* (2013.01)

(58) Field of Classification Search
CPC ........ B29C 45/14467; B29C 45/14639; B29K 2995/0005; B29K 2995/0007; B29L 2022/027; F42B 3/26
USPC .......................... 102/530; 280/736, 737, 741
See application file for complete search history.

(56) References Cited

U.S. PATENT DOCUMENTS

| | | | | |
|---|---|---|---|---|
| 6,749,219 B2* | 6/2004 | Edwards, II | ........ | B60R 21/2644 102/531 |
| 7,052,041 B2* | 5/2006 | McCormick | ........ | B60R 21/2644 280/741 |
| 7,427,082 B2* | 9/2008 | Schoenhuber | .......... | B60R 21/26 280/736 |
| 9,879,952 B2* | 1/2018 | Schwuchow | ........... | B23P 19/00 |
| 2002/0144621 A1* | 10/2002 | McFarland | ......... | B60R 21/2644 102/530 |
| 2003/0047925 A1* | 3/2003 | Edwards, II | ........ | B60R 21/2644 280/741 |
| 2003/0057686 A1* | 3/2003 | Goetz | ................ | B60R 21/2644 280/736 |
| 2004/0245753 A1* | 12/2004 | Kato | ....................... | F42B 3/04 280/736 |
| 2006/0033317 A1* | 2/2006 | Stevens | ................... | B60R 21/26 280/741 |
| 2007/0193465 A1* | 8/2007 | Stevens | ................... | F42B 3/107 102/202.1 |
| 2009/0114109 A1* | 5/2009 | Overton | ................. | F42B 3/103 102/200 |
| 2016/0169640 A1* | 6/2016 | Schwuchow | ........... | B23P 19/00 102/530 |
| 2020/0198571 A1* | 6/2020 | Knollhuber | ....... | B29C 45/14467 |

FOREIGN PATENT DOCUMENTS

| | | |
|---|---|---|
| JP | 2009244759 | 10/2009 |
| WO | 2016093946 | 6/2016 |

* cited by examiner

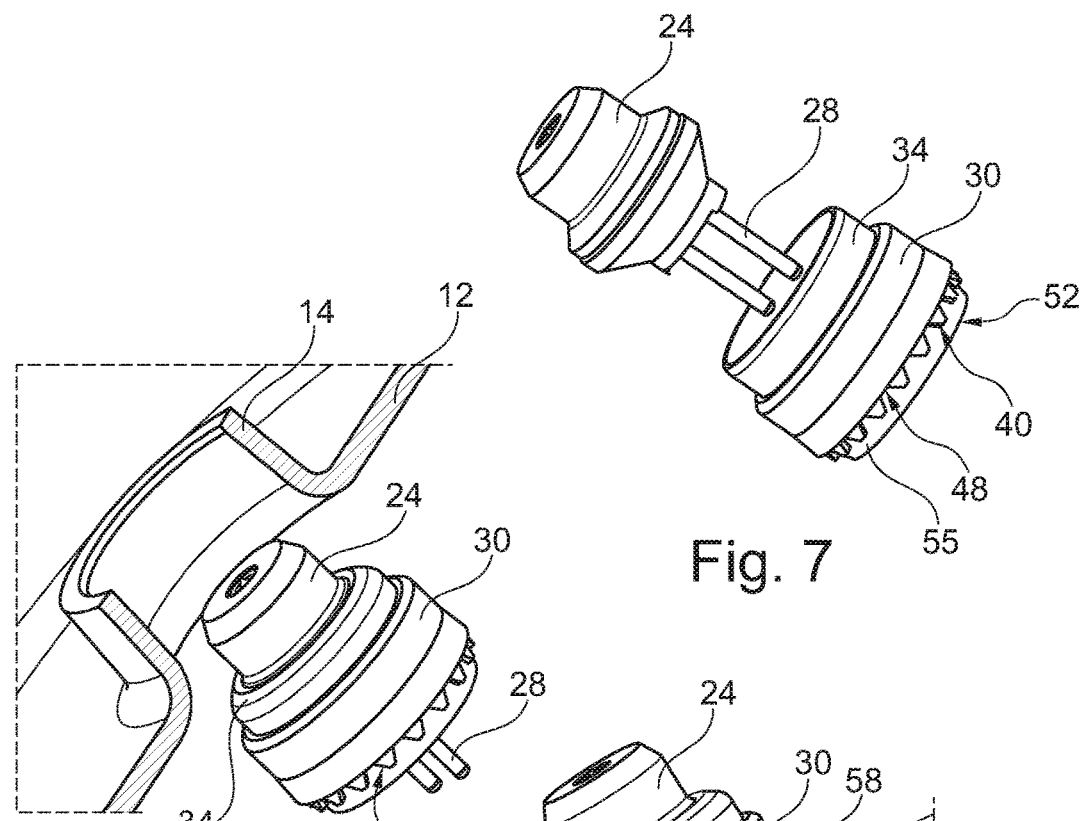
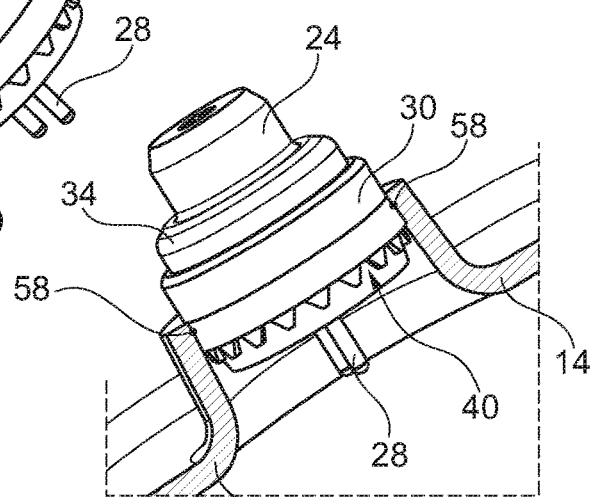
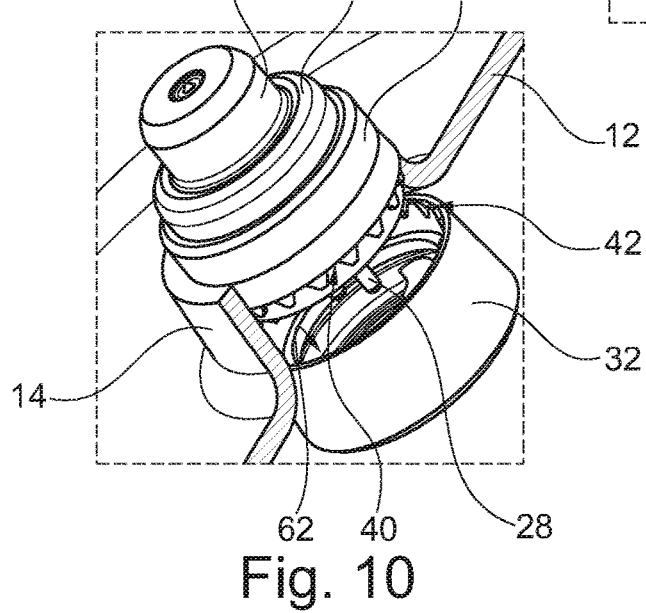
Fig. 7
Fig. 8
Fig. 9
Fig. 10

IGNITER SUPPORT, SUBASSEMBLY, GAS GENERATOR, AND PROCESS FOR MANUFACTURING A GAS GENERATOR

RELATED APPLICATIONS

This application corresponds to PCT/EP2018/058580, filed Apr. 4, 2018, which claims the benefit of German Application No. 10 2017 109 209.9, filed Apr. 28, 2017, the subject matter of which are incorporated herein by reference in their entirety.

BACKGROUND OF THE INVENTION

The invention relates to an igniter support for an igniter unit of a gas generator as well as to a subassembly comprising an igniter unit and an igniter support. In addition, the invention relates to a gas generator comprising such subassembly as well as to a method for manufacturing a gas generator.

In an automotive vehicle, gas generators are used, for example, to provide the inflation gas required for an airbag of an airbag module within short time, if a control unit outputs a signal for activation or release of the gas generator. For this purpose, gas generators usually include an igniter unit which is connected to the control unit of the automotive vehicle or the airbag module so that an igniter of the igniter unit can be appropriately controlled. As a rule, the connection is made via a cable having a plug that is plugged into a socket of the igniter unit. The socket is also referred to as retainer.

For receiving the igniter unit and, resp., the igniter on the gas generator an igniter support that represents an interface between the gas generator housing of a gas generator and the igniter unit can further be provided. Depending on the design of the igniter support, different types of igniter units can be used in the gas generator. Usually the igniter support is arranged at one end of the gas generator housing so that it seals a combustion chamber formed by the gas generator housing that may comprise a propellant, wherein at least part of the inflation gas for the airbag can be formed by combustion of the propellant.

The plugs used for controlling the igniter unit may have ground contacts which are electrically connected to the gas generator housing to ground the gas generator housing and, resp., to provide for electric potential equalization by bringing the gas generator housing for example to the same electric potential as that of a body of the automotive vehicle in which the gas generator is installed.

Typically, the igniter support is made from bars of metal in the form of a one-piece complex turned part, wherein manufacture of such igniter support is very complicated and thus expensive, especially because of turning and milling.

SUMMARY OF THE INVENTION

It is the object of the invention to enable a simple igniter support that can be manufactured at low cost, wherein equally an inexpensive subassembly including such igniter support, a gas generator comprising such subassembly and a manufacturing method including such gas generator is to be stated.

According to the invention, the object is achieved by an igniter support for an igniter unit of a gas generator, comprising a first holder element made from a first material and a second holder element made from a second material different from the first material, both holder elements being adapted to be positively coupled to each other, especially adapted to be at least partially positively nested.

Furthermore, the object of the invention is achieved by a subassembly comprising an igniter support of the afore-mentioned type and an igniter unit.

Moreover, the invention provides a gas generator, comprising a subassembly of the afore-mentioned type, wherein an, especially toroidal, gas generator housing is provided in which the subassembly is at least partially accommodated.

It is the fundamental idea of the invention that the igniter support is formed in two parts, the two parts of the igniter support being made from two different materials, for example a metal and a plastic material. In this way, the igniter support is at least partially electrically conducting, thus allowing an electric connection, especially a ground wire, from a plug to the gas generator housing to be designed in a simpler manner. A ground element which is provided in the igniter unit, for example, can be easily coupled to the holder element made from metal which in turn is coupled to the metallic gas generator housing.

The gas generator housing and the holder element made from metal thus may be formed of the same type of material. In this respect, said holder element of metal can be connected to the gas generator housing at low cost via a welded connection.

In addition, the entire igniter support can be manufactured at low cost as the holder element made from metal can be subjected to chipless forming, for example by extrusion. Accordingly, said holder element is an out-of-tool part. The holder element made from the plastic material as a plastic part can be manufactured at equally low cost, for example as injection molded part. Thus, complicated reworking of the igniter support is not required. Furthermore, the weight of the igniter support is reduced by reason of the holder element made from plastic material as compared to an igniter support that is completely made from metal.

The positive connection of the two holder elements further ensures that the holder elements can align with each other in the desired way and can be accommodated to be torsion-resistant in a gas generator housing. The two holder elements therefore initially need not be interconnected before they are introduced to the gas generator housing, as they are simply put on top of each other or, resp., assembled. This facilitates mounting of the igniter support on the gas generator housing, as the mounting step in which separate holder elements initially would have to be interconnected, for instance welded together, can be saved. Consequently, the holder elements can be configured so that they align so-to-speak automatically with each other as desired when they are assembled or, resp., nested.

Hence, it is possible that the first holder element is made from an, especially electrically conductive, metal and can be assembled with the igniter unit, especially an igniter thereof, to form a prefabricated assembly group. The second holder element may be made from plastic material. Here, the igniter which itself may be a prefabricated component and represents a constituent of the igniter unit can be inserted into and fastened to or, resp., in the first holder element to form the prefabricated assembly group which, in turn, can be inserted into and connected, especially welded, to the generator housing. After that, the second holder element made from plastic may be positively coupled to the first holder element.

One aspect provides that both holder elements can be positively coupled in the circumferential direction and/or in the radial direction. Consequently, the two holder elements substantially cannot be rotated relative to each other in the assembled condition, even if the holder elements are not yet fastened in the gas generator housing. In addition, they may be provided to be fixed relative to each other in the radial direction, even if the holder elements are not yet inserted and fastened in the gas generator housing, but are merely partially nested.

Another aspect provides the first holder element to have a first sawtooth profile and the second holder element to have a second sawtooth profile corresponding to the first sawtooth profile of the first holder element, especially by form closure. The positive coupling is achieved, inter alia, by the two sawtooth profiles whose respective points or, resp., "teeth" are pointing in the axial direction, especially are facing each other in the assembled condition of the igniter support. Via the sawtooth profiles thus a coupling of the two holder elements positive in the circumferential direction as well as in the radial direction is resulting. Moreover, due to the sawtooth profiles a large bearing surface is provided between the holder elements. The bearing surface may be used as joining surface, when for example adhesive material is applied to one or both sawtooth profile(s). Via the sawtooth profiles further torque loads in the igniter support can be prevented.

In particular, each of the two sawtooth profiles is provided at an axial end section of the corresponding holder element and is formed to be annularly circumferential at least in some areas. Consequently, the sawtooth profiles need not absolutely be formed to be circumferentially closed, but they may be formed to be circumferential in some areas only or may be formed to be discontinuous. The two axial end sections of the respective corresponding holder elements are facing each other in their assembled condition and, resp., in the assembled condition of the igniter support so that the two holder elements appropriately contact each other via the sawtooth profiles. Each of the sawtooth profiles extends annularly at the same radial distance from a corresponding center of the respective holder element through which a longitudinal axis of the respective holder element extends.

According to another aspect, the first holder element has a first stop face radially external with respect to the first sawtooth profile and axially reset against the second holder element, wherein the second holder element has a projecting second stop face radially external with respect to the second sawtooth profile and axially facing the first holder element, the two stop faces in the assembled condition of the two holder elements being adjacent to each other and each being preferably ring-shaped. The two sawtooth profiles are thus so-to-speak "protected" radially outwardly in the assembled condition of the igniter support, as the respective edges of the holder elements abut against each other via the stop faces thereof. Consequently, in the assembled condition, the sawtooth profiles cannot be seen and, resp., contacted from outside.

Furthermore, the first holder element may have a projecting first contact surface radially internal vis-à-vis the first sawtooth profile and axially pointing toward the second holder element, wherein the second holder element has a second contact surface radially internal vis-à-vis the second sawtooth profile and axially reset against the first holder element, both contact surfaces in the assembled condition of the holder elements being adjacent to each other and being preferably ring-shaped. The two holder elements thus contact each other in the assembled condition even via the contact surfaces that are arranged radially internally vis-à-vis the sawtooth profiles.

Generally, the two holder elements thus may contact each other via the radially external stop faces, the respective sawtooth profiles as well as the radially internal contact surfaces. The contact surfaces as well as the stop faces are arranged to be axially offset relative to the sawtooth profiles, especially axially projecting and, resp., axially reset, so that a stepped connection is resulting between the two holder elements. The stepped connection between the two holder elements consequently has, when viewed in the radial direction, substantially three steps formed due to the stop faces, the sawtooth profiles and the contact surfaces. In this way, in the interface area of the two holder elements high stability is obtained as the axial end section of the one holder element is guided in the other holder element.

The sawtooth profiles may be designed such that with their points and, resp., valleys they are running into the respective radially external stop faces. Alternatively, or additionally, the sawtooth profiles may be designed such that with their points and, resp., valleys they are running into the respective radially internal contact surfaces.

Another aspect provides each of the stop faces and/or the contact surfaces to be ring-shaped. In this way, the positive connection of the two holder elements is resulting in the radial direction, as the respective surfaces are offset against each other in the axial direction, especially against the sawtooth profiles arranged between the surfaces, when viewed in the radial direction.

One aspect provides that the first holder element is formed at least in some areas so that the igniter unit is at least partially received by the first holder element. In addition, or as an alternative to this, the igniter unit, especially an igniter thereof, is bonded at least in some areas with the first holder element. For example, the igniter of the igniter unit is crimped or beaded in the first holder element. Due to the plastic deformation of the first holder element, the position of the igniter is ensured to be fixed with respect to the igniter support.

According to another aspect, the igniter unit includes a socket that is inserted in the second holder element. The socket represents the common plug interface in which a corresponding plug coding is provided. Usually, the socket is made from plastic material, wherein a metal insert is provided via which at least one short circuit spring as well as at least one ground element can be in the form of a ground claw. The socket formed from plastic material may be inserted in the second holder element made from plastic material as a separate component. Preferably, the second holder element includes a universally configured socket seat so that different sockets can be inserted.

Furthermore, the socket can be provided to be injected into the second holder element or, resp., to be attached to the latter by injection molding. The socket is thus integrated in one piece or by adhesive closure in the second holder element by means of injection molding. Consequently, merely one single plastic component is provided which is, at the same time, the socket of the igniter unit and the second holder element of the igniter carrier.

One aspect provides that the gas generator housing comprises at least one closing member at which the subassembly, especially the first holder element thereof, is fastened, preferably by means of a welded joint. The gas generator housing may be designed in two parts, wherein it comprises, apart from the closing member, a diffusor in the form of a toroid or, resp., a cap or a half-shell which are connected, for example welded, to each other. The diffusor may comprise outlet openings through which, upon activation of the gas generator, inflation gas can be discharged from the interior of the gas generator into a surrounding airbag, as intended. The subassembly can be easily coupled to the closing member by welding the first holder element to a formed portion of the closing member, for example. Both of the first holder element and the closing member may be made from metal so that a welded connection that ensures sealing of an adjacent combustion chamber can be formed in a simple manner. Due to the like type of material, an optimum joining connection can be produced between the igniter support, especially the first holder element, and the gas generator housing.

The gas generator may be a pyrotechnical gas generator, a hybrid gas generator, a belt tensioner or an actuator, especially for a hood prop or a roll-over bar of a vehicle, the gas generator housing being tube-shaped or toroid-shaped. In so far, the gas generator may be used for various purposes, for instance as part of a vehicle occupant protection device comprising an airbag module, or as a general actuator, especially for pedestrian protection.

Consequently, the invention also provides a subassembly comprising an igniter support according to the invention and an igniter unit.

In the subassembly the first holder element may be formed at least in some areas so that the igniter unit is at least partially received by the first holder element. In addition, or as an alternative, it is possible for the igniter unit, especially an igniter thereof, to be bonded at least in some areas to the first holder element.

Moreover, in the subassembly the igniter unit may comprise a socket that is inserted in the second holder element or is attached by injection molding to the second holder element to form an integral component with the latter. Preferably, the socket includes a ground element which contacts the first holder element in an electrically conducting manner.

In addition, the invention provides a method for manufacturing a gas generator, especially a gas generator of the afore-mentioned type, comprising the following steps of:
providing a gas generator housing of a first holder element, a second holder element and an igniter,
inserting the igniter into the first holder element, optionally previously inserting a sealing element into the same, and fastening the igniter to the first holder element, preferably by crimping and/or bonding, to configure a prefabricated assembly group,
inserting the prefabricated assembly group into an opening of the gas generator housing and fastening, preferably by means of welding, the prefabricated assembly group to a portion of the first holder element with the gas generator housing, and
inserting the second holder element into the opening of the gas generator housing in the direction of the prefabricated assembly group, while preferably aligning the second holder element with the first holder element in the circumferential direction until the second holder element abuts on the first holder element.

As already explained, the igniter support can be formed in two parts, wherein the holder elements are introduced separately and individually into the gas generator housing. Accordingly, the two holder elements need not be interconnected before to configure a unit that is introduced together to the gas generator housing. The first holder element may be welded to the gas generator housing, especially with a closing member of the gas generator housing, which is easily resulting in a tight connection with the gas generator housing including the combustion chamber. The entire combustion chamber of the gas generator is thus enclosed by metal parts so that the walls of the combustion chamber may be made from the same type of material.

In addition, the holder element of the igniter support made from metal may be used to contact ground or, resp., short circuit elements. Thus, implementation of a ground or short circuit connection is facilitated, as an electrically conducting connection to the gas generator housing is formed already via the holder element. Consequently, a ground element may be provided which bridges the second holder element of the igniter support made from plastic material in an electrically conducting manner.

Alternatively, the second holder element may be made from electrically conductive plastic material so that no separate ground element has to be utilized. Nevertheless, the igniter support is of multi-part design, wherein the first holder element made from metal is an out-of-tool part so that it need not be reworked. Due to the positive coupling of the two holder elements, the latter need not initially be interconnected.

One aspect provides the igniter to be fastened to the first holder element by partially forming the first holder element. Accordingly, the igniter can be easily arranged true to position on the igniter support. Thus, the first holder element can be plastically formed to receive the igniter. For example, the igniter is at least partially beaded or crimped into the first holder element.

Furthermore, a socket of the igniter unit can be inserted, especially injected into the second holder element. The socket may comprise the components required for the ground wire with which the plug to be inserted into the socket will interact. For example, a short circuit spring may be provided for short-circuiting the contact pins of the igniter unit, unless a plug is plugged in. The short circuit spring as well as a ground element required for the ground wire may be configured by a joint metal insert, the ground element being in the form of a ground claw, for example. The ground element thus claws into the first holder element when the two holder elements are assembled.

Alternatively, the socket and the second holder element can be integrally connected to each other by injecting the socket into the second holder element so that a component is resulting which is, at the same time, part of the igniter support and of the igniter unit. The socket made from plastic material and the second holder element made from plastic material are appropriately interconnected by injection-molding. The socket can be attached by injection-molding to the already manufactured holder element, with the integrally formed component resulting. Further, the socket and the second holder element can be manufactured simultaneously by two-component injection molding so that a connection by adhesive closure is resulting.

Accordingly, a method is possible in which a prefabricated socket optionally having an integrated ground element is inserted into the second holder element. Or, a socket is manufactured by injection or, resp., attaching by injection to the second holder element, optionally comprising a ground element. It is applicable to both methods that, in case of the presence of the ground element, the latter is made to contact the first holder element in an electrically conducting manner.

According to another aspect, the first and second holder elements are jointly fastened by positive and/or non-positive engagement of a first sawtooth profile of the first holder element and a second sawtooth profile of the second holder element, especially the two holder elements being additionally bonded to each other in the area of their sawtooth profiles. Bonding may be carried out at the respective sawtooth profiles of the holder elements, as there a large joining area is available.

In the method according to the invention, it is of particular advantage that initially a compact prefabricated assembly group comprising only two components is produced. As initially only the igniter is inserted into and fastened to the first holder element, merely extremely little space is required for said assembling. It is provided here that the igniter is inserted in the axial direction into a receiving opening of the first holder element and a retaining portion, which is in the form of an axially protruding radially circumferential edge section of the first holder element, is bent radially inwardly onto a corresponding peripheral area of the igniter and, resp., is crimped onto the latter. Optionally, before insertion of the igniter, a sealing element, preferably an O-ring, can be inserted into the receiving opening of the first holder element so as to subsequently insert the igniter onto said sealing element to increase the tightness of the connection between the igniter and the first holder element. In order to additionally increase said tightness, the igniter could additionally be fastened to the first holder element by bonding, with the bonding being configured by a suitable adhesive covering the sealing element and corresponding contact areas of the igniter and the first holder element. Such bonding may be carried out even without the sealing element and, as an alternative, even without crimping the circumferential edge section of the first holder element, wherein thus the igniter is retained in and fastened to the first holder element merely by the bonding.

BRIEF DESCRIPTION OF THE DRAWINGS

Further advantages and characteristics of the invention will be evident from the following description and the drawings which are referred to, wherein:

FIG. 7 is a first method step for manufacturing a gas generator according to the invention, FIG. 8 is a second method step for manufacturing a gas generator according to the invention, FIG. 9 is a third method step for manufacturing a gas generator according to the invention, and FIG. 10 is a fourth method step for manufacturing a gas generator according to the invention.

DESCRIPTION

Figure 1:
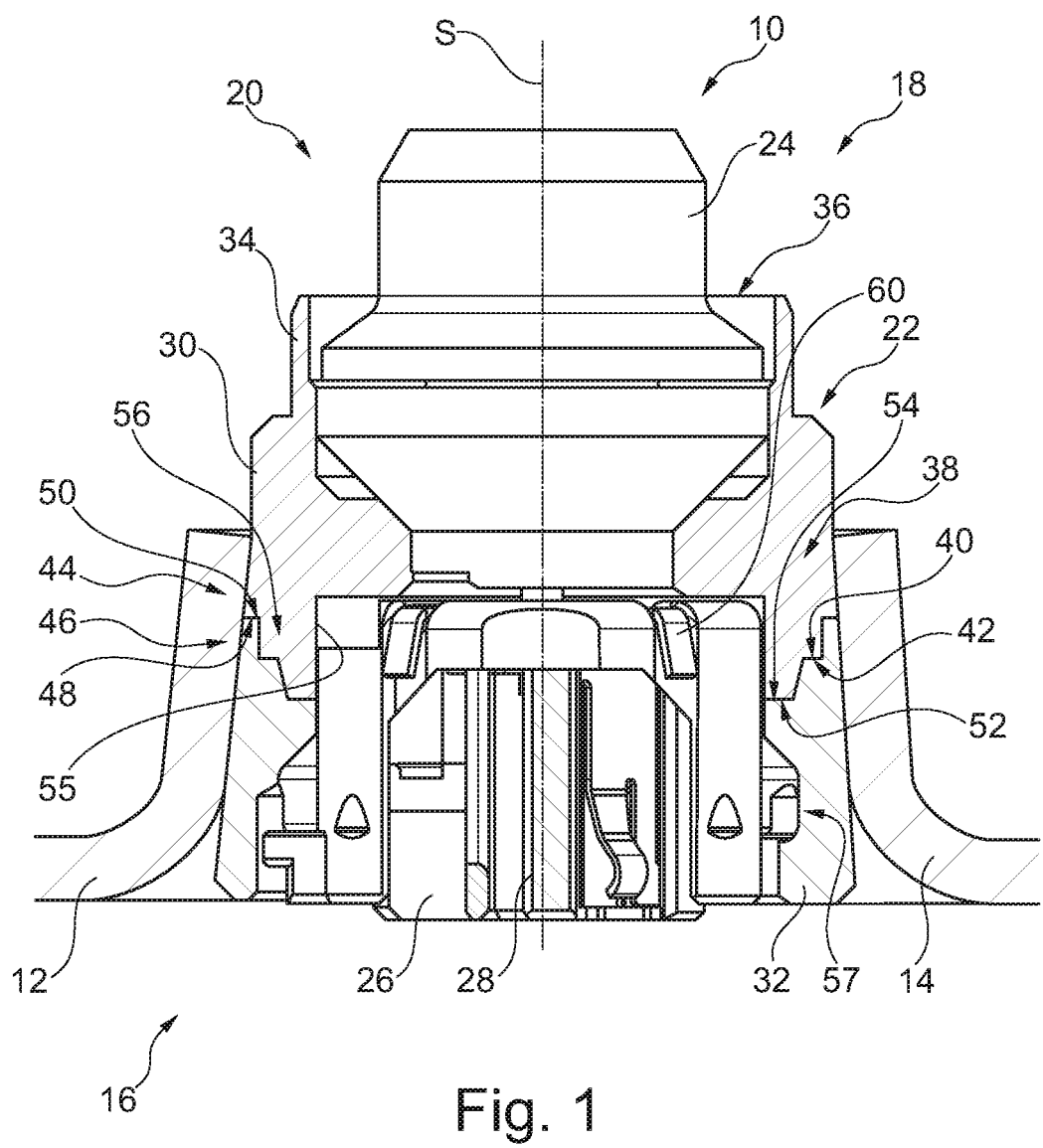
FIG. 1 shows a sectional view of a partially represented gas generator according to the invention having a subassembly according to the invention.
Figure 2:
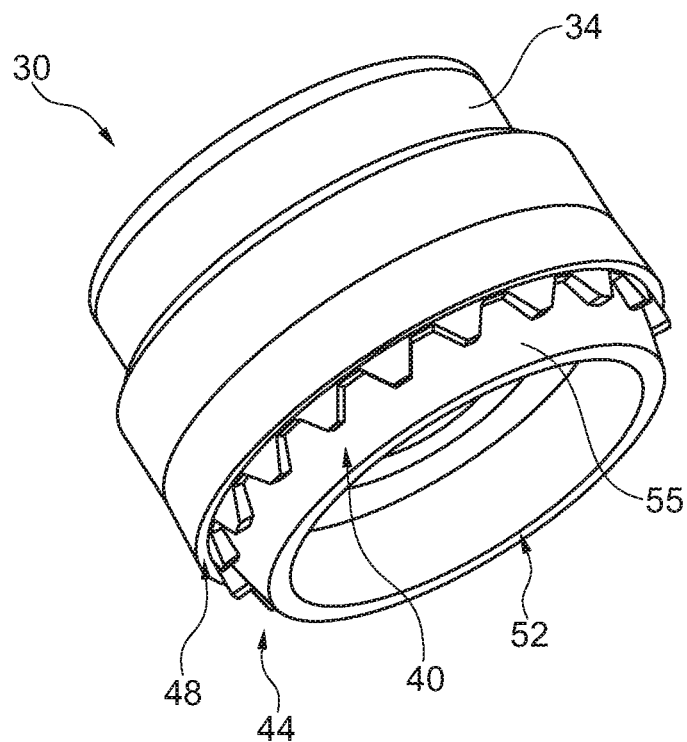
FIG. 2 shows a perspective view of a first holder element of an igniter support according to the invention.

In FIG. 1, a gas generator 10 which can generate inflation gas for an airbag by which a vehicle occupant of an automotive vehicle can be protected in the event of crash is partially shown in sectional representation.

The gas generator 10 comprises a gas generator housing 12 merely a closing member 14 of which is partially shown in FIG. 1. The entire gas generator housing 12 may be toroid-shaped, wherein, apart from the closing member 14, a toroidal or, resp., cap-shaped or half shell-shaped diffusor not shown here is provided to which diffusor the closing member 14 is fastened, for example welded. Accordingly, the entire gas generator 10 may be substantially toroidal, as the diffusor which may include gas outlet openings is in the form of a first half shell which is tightly connected, especially welded, radially circumferentially to the closing member 14 configured as a second half shell being complementary to the diffusor.

The gas generator 10 has an axially central longitudinal axis S and is substantially symmetric with respect to the longitudinal axis S.

The gas generator 10 further comprises a subassembly 16 fastened to the gas generator housing 12, especially to the closing member 14, wherein the subassembly 16 closes or seals the gas generator housing 12 so that a combustion chamber 18 to which the subassembly 16 is adjacent is formed in the gas generator housing 12.

In the combustion chamber which is shown only in same areas here, a propellant (not shown) may be accommodated which is ignited and burnt upon activation of the gas generator 10 to produce gas, for example for inflating an airbag. The propellant may be a filling of individual propellant bodies such as e.g. compressed propellant pellets or extruded bodies, but may also be in the form of a monolithic molded body or in the form of lined-up disks or rings.

The subassembly 16 has an igniter unit 20 and an igniter support 22 that supports the igniter unit 20 at least partially within the gas generator housing 12. The igniter support 22 forms the interface between the gas generator housing 12 and the igniter unit 20. Generally, the igniter support 22 ensures the igniter unit 20 to take a desired position with respect to the gas generator housing 12.

The igniter unit 20 comprises an igniter 24 which partially protrudes into the combustion chamber 18 as well as a socket 26, also being referred to as retainer, into which a plug (not shown) can be plugged to electrically contact the igniter 24 and, resp., to couple the latter to a controller for controlling and, resp., activating the igniter unit 20. For this purpose, the igniter 24 has contact pins 28 which are received inside or, resp., surrounded by the socket 26. For example, the socket 26 is a plastic part.

Each of the igniter 24 and the socket 26 is held by the igniter support 22, as can be seen from FIG. 1.

For this purpose, the igniter support 22 has a first holder element 30 and a second holder element 32 which are formed separately from each other and are positively coupled to each other, especially in the circumferential direction and in the radial direction. The two holder elements 30, 32 are moreover made from different materials.

In the shown embodiment, the first holder element 30 is made from metal so that it is electrically conductive, whereas the second holder element 32 is made from plastic material which is not electrically conductive. The two holder elements 30, 32 are shown in detail in each of the FIGS. 2 to 6.

The first holder element 30 serves for fixing the igniter 24 within the gas generator housing 12. To this end, the first holder element 30 includes an axially protruding annular retaining portion 34 which is collar-shaped. The retaining portion 34 may be (plastically) formed at its free end to receive the igniter 24 safely in position, wherein especially the retaining portion 34 is appropriately beaded or crimped, in particular radially inwardly onto a corresponding circumferential area of the igniter. Preferably, merely a lower area of the igniter 24, i.e. an area facing the contact pins 28, is retained by the retaining portion 34 so that an upper area, i.e. an area remote from the contact pins 28, of the igniter 24 extends into the combustion chamber 18, wherein the upper area can be opened upon activation of the igniter 24 and can release hot gases and, resp., particles which can ignite the propellant (not shown) within the combustion chamber.

Alternatively or additionally to the described (plastic) forming of the retaining portion 34, it is also possible for the igniter 24 to be fixed and, resp., fastened in the first holder element 30 by means of bonding.

Between the igniter 24 and the first holder element 30 a sealing element not shown here may be inserted to increase tightness in the connecting area. The sealing element may be an O-ring, for example which is pinched between the igniter 24 and the first holder element 30. The first holder element 30 thus forms a seat 36 for the igniter 24 and the optional sealing element via the retaining portion 34.

The positive connection 38 of the two holder elements 30, 32 is resulting, inter alia, from a first sawtooth profile 40 on the first holder element 30 and a second sawtooth profile 42 on the second holder element 32, as is evident especially from FIGS. 2 to 6.

Figure 3:
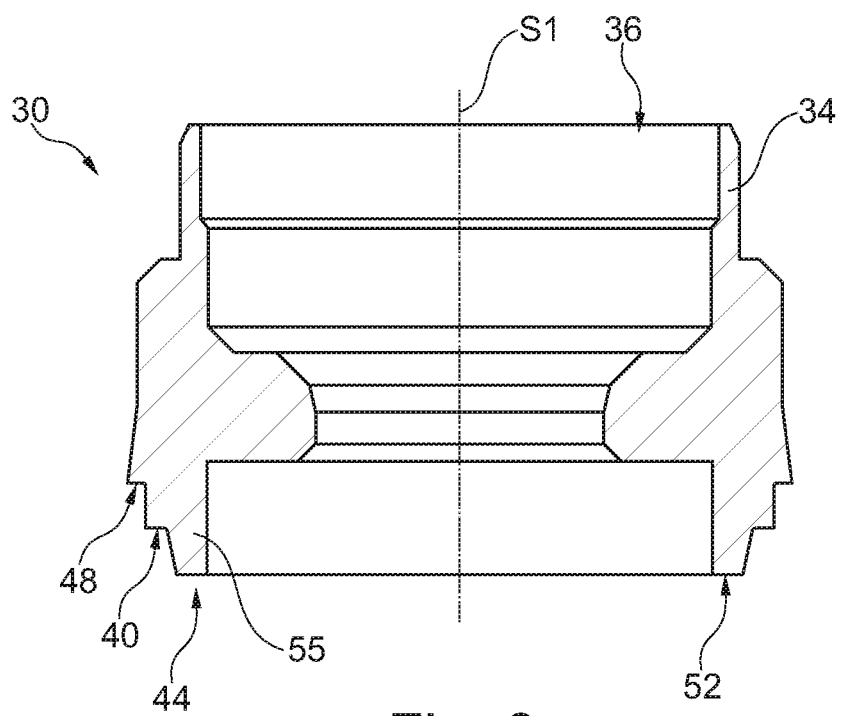
FIG. 3 shows a sectional view of the first holder element of FIG. 2.
Figure 4:
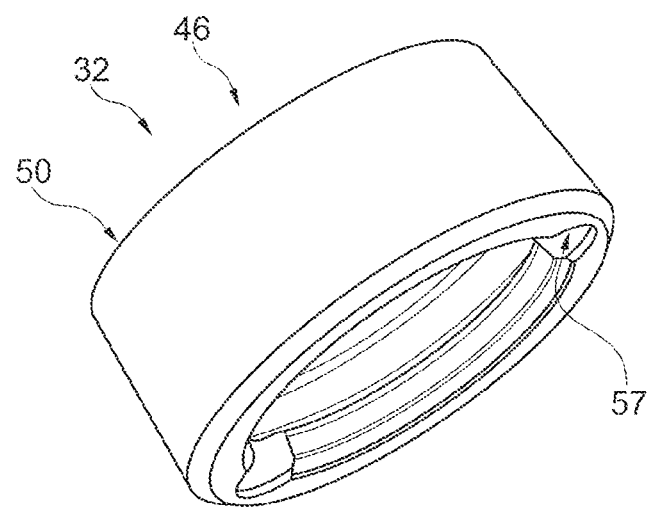
FIG. 4 shows a perspective view of a second holder element of an igniter support according to the invention.
Figure 5:
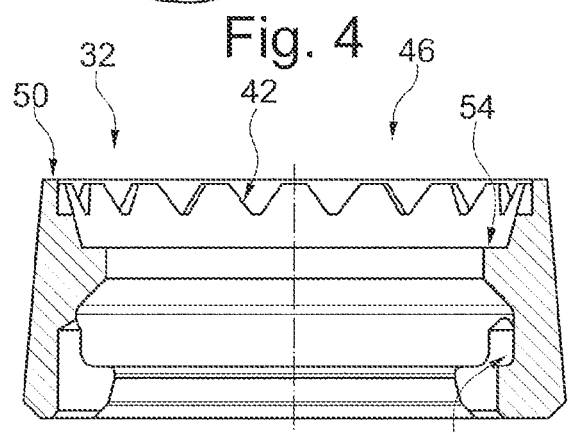
FIG. 5 shows a sectional view of the second holder element of FIG. 4.
Figure 6:
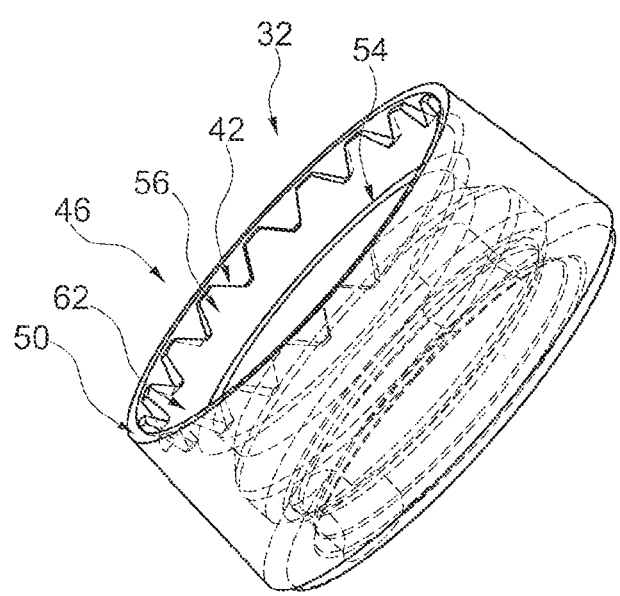
FIG. 6 is a partly transparent representation of the second holder element of FIG. 4.

In general, the two holder elements 30, 32 are formed substantially symmetrically, wherein they equally have a respective longitudinal axis S1, S2 (see FIGS. 3 and 5). The longitudinal axes S1, S2 in the mounted state coincide with the longitudinal axis S of the gas generator 10 (see FIG. 1).

Each of the two sawtooth profiles 40, 42 is formed to be annularly circumferential, with the respective points pointing in the axial direction. The sawtooth profiles 40, 42 are provided at axial end sections 44, 46 of the first holder element 30 and, resp., of the second holder element 32. The axial end sections 44, 46 are opposed to each other in the assembled condition of the igniter support 22 so that the two sawtooth profiles 40, 42 are engaged (see FIG. 1). This results in form closure in the circumferential direction between the two holder elements 30, 32 via which form closure an anti-twist protection is formed.

The first holder element 30 moreover has a stop face 48 radially external vis-à-vis the first sawtooth profile 40 and being axially reset, viz. facing away from the second holder element 32, the stop face interacting with a second stop face 50 which is formed on the second holder element 32. The second stop face 50 is equally radially external vis-à-vis the second sawtooth profile 42 and is axially protruding, viz. facing the first holder element 30, so that both stop faces 48, 50 are adjacent to each other in the assembled condition (see FIG. 1).

Moreover, the first holder element 30 has a first contact surface 52 radially internal vis-à-vis the first sawtooth profile 40 and axially projecting, viz. facing the second holder element 32, the contact surface in the assembled condition abutting on a second contact surface 54 which is formed on the second holder element 32. The second contact surface 54 is radially internal vis-à-vis the second sawtooth profile 42 and axially reset, viz. facing away from the first holder element 30.

The first contact surface 52 is provided on a collar-shaped portion 55 which is ring-shaped and sleeve-shaped. The collar-shaped portion 55 provides a guide for the igniter unit 20, especially for the socket 26, via an inner cylindrical surface area, as is evident, for example, from FIG. 1.

Both the stop faces 48, 50 and the contact surfaces 52, 54 are ring-shaped so that a continuous contact is resulting in the circumferential direction via the stop faces 48, 50 and, resp., the contact surfaces 52, 54, when the igniter support 22 is in the assembled condition.

It is especially evident from FIG. 1 that the two holder elements 30, 32 abut on each other in stepped shape via the stop faces 48, 50, the two sawtooth profiles 40, 42 as well as the contact surfaces 52, 54. Accordingly, the axial end section 46 of the second holder element 32 constitutes a guide 56 for the axial end section 44 of the first holder element 30, when both holder elements 30, 32 are or will be nested. The stability of the igniter support 22 is appropriately increased.

Especially, due to the stepped connection of the two holder elements 30, 32, a positive connection is made in the radial direction, as the axial end section 44 of the first holder element 30 is plugged at least partially into the axial end section 46 of the second holder element 32. Via the two sawtooth profiles 40, 42 the positive connection is resulting in the circumferential direction and acts as an anti-twist protection. The positive connection in the axial direction is correspondingly established via the stop faces 48, 50, the contact surfaces 52, 54 and the sawtooth profiles 40, 42.

The second holder element 32 in addition includes at least one undercut 57 via which the socket 26 can be disposed and fastened on the second holder element 32 as desired (see FIG. 5).

By way of FIGS. 7 to 10, hereinafter it shall be illustrated in which way the gas generator 10 shown in FIG. 1 is manufactured.

At first the igniter 24 of the igniter unit 20 is coupled to the first holder element 30 by inserting the igniter 24 initially into the holder element 30, especially into the seat 36 (see FIG. 7). In this step, also the optional sealing element can be inserted, being positioned between the first holder element 30 and the igniter 24. Then the holder element 30, especially the retaining portion 34, is (plastically) formed in some areas so that the igniter 24 is received true to position in the first holder element 30. Thus, the igniter 24 can be crimped or beaded.

After having connected the igniter 24 to the first holder element 30, the first holder element 30 is press-fitted into the gas generator housing 12, especially the closing member 14. This is evident from FIG. 8.

Subsequently, the first holder element 30 can be connected to the gas generator housing 12, especially the closing member 14, via a welded joint indicated by two welding spots 58 in FIG. 9. The welded joint may be circumferential, thus ensuring a tight connection between the first holder element 30 and the gas generator housing 12.

After coupling the first holder element 30 to the gas generator housing 12, the second holder element 32 can be coupled to the first holder element 30 (see FIG. 10). To this end, the second holder element 32 is equally press-fitted into the gas generator housing 12 until it abuts against the first holder element 30 which is already fastened true to position on the gas generator housing 12. For this purpose, where appropriate, there may be required alignment of the second holder element 32 in the circumferential direction with the first holder element 30 so that the sawtooth profiles 40, 42 of the two holder elements 30, 32 are positioned to fit into each other while being correspondingly compatible as to shape.

Previously, an adhesive can be applied to the second sawtooth profile 42 so that the first holder element 30 and the second holder element 32 are bonded to each other additionally via the sawtooth profiles 40, 42. Alternatively, or in addition, an adhesive may be applied to the first sawtooth profile 40. The two sawtooth profiles 40, 42 constitute a large joining surface.

As is visible from FIG. 10, the second holder element 32 comprises a socket interface 62 via which the socket 26 can be inserted into the second holder element 32.

The second holder element 32 generally may be configured so that variously designed sockets, which may especially have different geometric shape codes, can be inserted into the second holder element 32. Accordingly, a universal socket interface 62 is concerned.

The socket 26 may be manufactured of plastic material, wherein there is provided a metal insert not shown in more detail (FIG. 1) comprising at least one short circuit spring and at least one ground element 60 via which a ground wire to the gas generator housing 12 can be established. As soon as a plug is plugged into the socket 26, the short circuit element is pressed away by the contact pins 28 such that the previously electrically conducting short circuit between the two contact pins 28 is neutralized.

In accordance with the embodiment illustrated in FIG. 1, the at least one ground element 60 is in the form of an electrically conducting ground claw which, when the second holder element 32 is inserted, claws into the first holder element 30 made from metal. Since the first holder element 30 is connected to the gas generator housing 12 in an electrically conducting manner, this results in grounding of the gas generator housing 12 and, resp., the gas generator housing 12 is brought to the same electric potential as a vehicle body of a vehicle in which the gas generator is accommodated. Thus, a so-called "ground connection" is possible, meaning that the plug adapted to be plugged into the socket has a metallic ground contact terminal that can be connected to be electrically conducting via the ground element, further via the first holder element to the gas generator housing so as to constitute a desired electric potential equalization between the electric potential of the vehicle, especially the vehicle body, and the electric potential of the gas generator housing.

As an alternative to inserting the socket 26 into the second holder element 32, the socket 26 may be injected in the second holder element 32. Then, merely one single plastic component is provided which is, at the same time, part of the igniter support 22 (as second holder element 32) and part of the igniter unit 20 (as socket 26). For example, the second holder element 32 and the socket 26 are simultaneously manufactured by two-component injection molding. Alternatively, the socket 26 may be attached by injection molding to the second holder element 32, wherein equally a one-piece component is resulting.

Thus, there are provided an igniter support 22, a subassembly 16 and a gas generator 10 which can be manufactured and mounted in a simple and low-cost manner and additionally are adapted to enable ground contact and ground connection, respectively.

The invention claimed is:

1. An igniter support (22) for an igniter unit (20) of a gas generator (10), comprising a first holder element (30) made from a first material and a second holder element (32) made from a second material different from the first material, wherein the two holder elements (30, 32) can be at least partially positively nested in the circumferential direction to enable torque transmission between the two holder elements (30, 32).

2. The igniter support (22) according to claim 1, wherein both holder elements (30, 32) can be positively coupled in the radial direction.

3. An igniter support (22) for an igniter unit (20) of a gas generator (10), comprising a first holder element (30) made from a first material and a second holder element (32) made from a second material different from the first material, wherein the two holder elements (30, 32) can be at least partially positively nested, wherein the first holder element (30) has a first sawtooth profile (40) and the second holder element (32) has a second sawtooth profile (42) corresponding to the first sawtooth profile (40) of the first holder element (30).

4. The igniter support (22) according to claim 3, wherein each of the two sawtooth profiles (40, 42) is provided at an axial end section (44, 46) of the corresponding holder element (30, 32) and is formed to be annularly circumferential at least in some areas.

5. The igniter support (22) according to claim 3, wherein the first holder element (30) has a first stop face (48) which is radially external by way of the first sawtooth profile (40) and axially reset, facing away from the second holder element (32), and in that the second holder element (32) has a second stop face (50) which is radially external by way of the second sawtooth profile (42) and axially projecting, facing the first holder element (30), the two stop faces (48, 50) in the assembled condition of the two holder elements (30, 32) being adjacent to each other and each being ring-shaped.

6. The igniter support (22) according to claim 3, wherein the first holder element (30) has a first contact surface (52) which is radially internal by way of the first sawtooth profile (40) and axially projecting, facing the second holder element (32), and in that the second holder element (32) has a second contact surface (54) which is radially internal by way of the second sawtooth profile (42) and axially reset, facing away from the first holder element (30), the two contact surfaces (52, 54) in an assembled condition of the two holder elements (30, 32) being adjacent to each other and each being preferably ring-shaped.

7. A subassembly (16) comprising an igniter support (22) according to claim 1 and an igniter unit (20).

8. The subassembly (16) according to claim 7, wherein the first holder element (30) is formed at least in some areas so that the igniter unit (20) is received at least partially by the first holder element (30), and/or in that the igniter unit (20), is bonded to the first holder element (30) at least in some areas, wherein the igniter unit (20) may include a socket (26) which is inserted in the second holder element (32).

9. A gas generator (10) comprising a subassembly (16) according to claim 1, wherein a gas generator housing (12) is provided in which the subassembly (16) is at least partially received.

10. The gas generator (10) according to claim 9, wherein the gas generator housing (12) comprises at least one closing member (14) to which the subassembly (16) is fastened.

11. The gas generator (10) according to claim 9, wherein the gas generator (10) is a pyrotechnic gas generator, a hybrid gas generator, a belt tensioner or an actuator, with the gas generator housing (12) being tube-shaped or toroid-shaped.

12. A method for manufacturing a gas generator (10) according to claim 1, comprising the following steps of:
a) providing a gas generator housing (12), a first holder element (30), a second holder element (32) and an igniter (24),
b) inserting the igniter (24) into the first holder element (30), optionally previously inserting a sealing element into the same, and fastening the igniter (24) to the first holder element (30) for forming a prefabricated assembly group,
c) inserting the prefabricated assembly group into an opening of the gas generator housing (12) and fastening the prefabricated assembly group at a portion of the first holder element (30) to the gas generator housing (12), and d) inserting the second holder element (32) into the opening of the gas generator housing (12) in the direction of the prefabricated assembly group until the second holder element (32) is adjacent to the first holder element (30).

13. The method according to claim 12, wherein the first holder element (30) and the second holder element (32) are fastened to each other by positive and/or non-positive engagement of a first sawtooth profile (40) of the first holder element (30) and a second sawtooth profile (42) of the second holder element (32).

14. The method according to claim 12, wherein a socket (26) is prefabricated and inserted into the second holder element (32) or manufactured by being injected in or attached by injection molding to the second holder element (32).

15. The method according to claim 14, wherein the socket (26) includes a ground element (60) that is made to contact the first holder element (32) in an electrically conducting manner.

\* \* \* \* \*